UNITED STATES PATENT OFFICE.

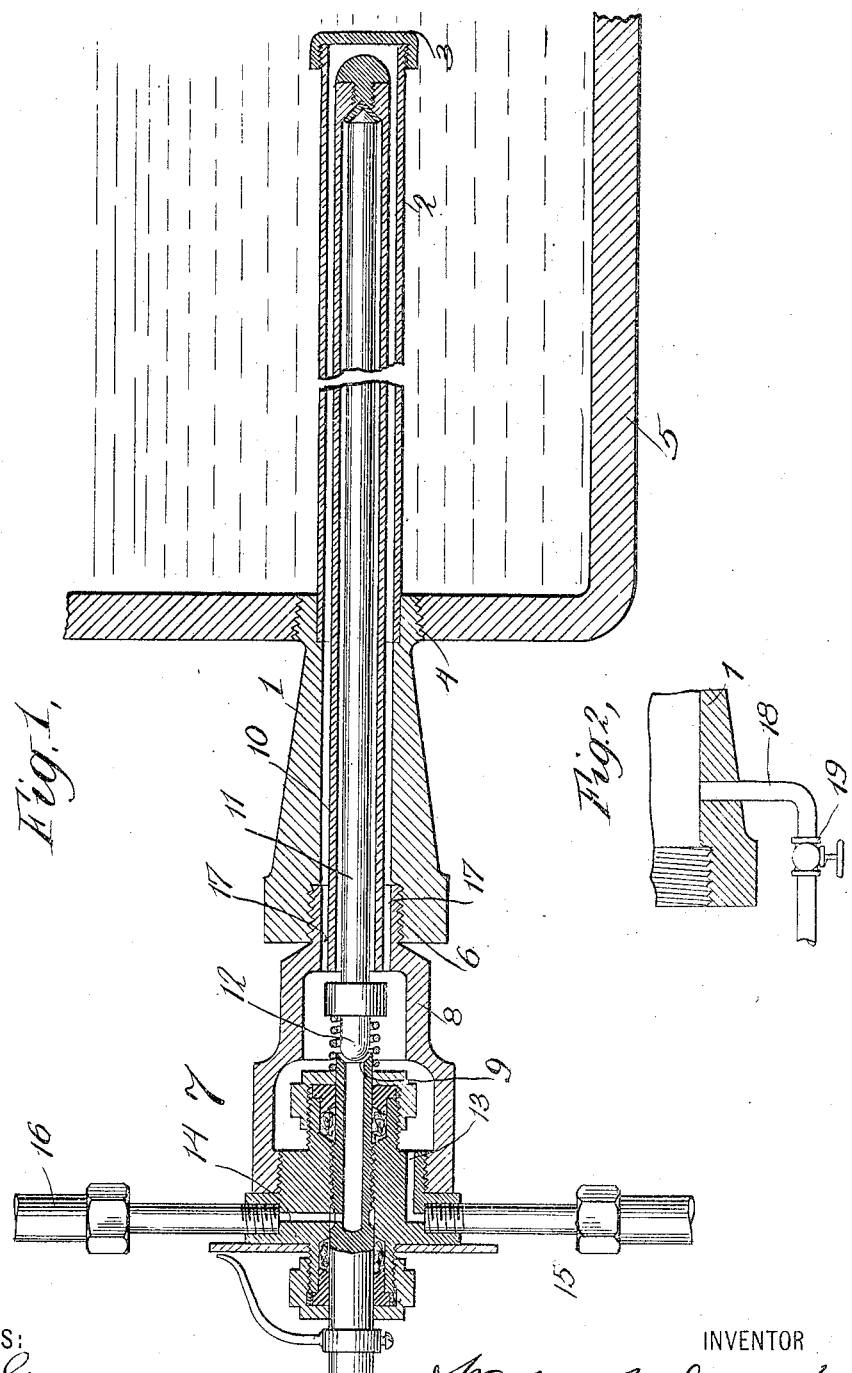

WILLARD WADSWORTH, OF PLAINFIELD, NEW JERSEY, ASSIGNOR TO WILLIAM B. WADSWORTH, OF PLAINFIELD, NEW JERSEY.

TEMPERATURE-REGULATING MEANS.

No. 808,707.          Specification of Letters Patent.          Patented Jan. 2, 1906.

Application filed August 11, 1905. Serial No. 273,755.

*To all whom it may concern:*

Be it known that I, WILLARD WADSWORTH, a citizen of the United States of America, and a resident of Plainfield, county of Union, State of New Jersey, have invented certain new and useful Improvements in Temperature-Regulating Means, of which the following is a specification, reference being had to the accompanying drawings, forming a part thereof.

My invention relates to temperature-regulating means, and particularly to means designed to permit the removal of temperature-regulators from tanks containing liquid while the liquid is retained in the said tanks.

In a copending application by Olaf Saugstad, filed March 18, 1905, Serial No. 250,754, there is described and claimed a cut-off socket adapted for the reception of a thermostatic regulator, and it is arranged to be fitted to a tank containing the liquid to be regulated. The socket is provided with means for opening and closing communication between the interior of the socket and the liquid within the tank, so that free circulation between the socket and the tank may be maintained while the regulator is in position, but that such circulation may be interrupted when desired, so that discharge of liquid from the tank may be prevented when the regulator is removed. For certain purposes, however, I find it disadvantageous to permit the liquid from within the tank to have direct access to the thermostatic portion of the regulator—as, for instance, when a liquid is employed in the tank such as would tend to corrode or destroy the thermostatic means—yet liquid is desirable in the socket when the parts are in operative condition to properly conduct the heat of the liquid in the tank to the thermostatic means. In my present invention, then, I provide means for admitting liquid from an outside source to within the socket for the purpose of thus conducting the heat of the liquid contained in the tank to the thermostatic means, and thus obtain the necessary conduction of heat without permitting the liquid in the tank to have direct access to the thermostatic means.

It is common to employ water under pressure as a motive fluid to be controlled by the regulator, and in such case I conveniently provide a branch opening in the regulator to admit water therefrom to within the socket, thus not only saving extra connections, but further simplifying the device, as the employment of special controlling means for the supply of liquid to the socket is thereby dispensed with.

In order that my invention may be fully understood, I will now describe an embodiment thereof with reference to the accompanying drawings illustrating same and will then point out the novel features in claims.

In the drawings, Figure 1 illustrates in central longitudinal section a cut-off socket embodying my invention, showing the same in position in the tank and showing also in central longitudinal section a regulator fitted thereto. Fig. 2 is a detail view of a portion of the socket provided with a different form of connection for admitting liquid thereto.

The socket comprises a shell 1, having a tubular extension 2, closed at the end by a cap 3. The shell is provided with a screw-threaded portion 4, by which it may be screwed into a correspondingly-screw-threaded opening in the wall of a tank, boiler, or the like. A portion of such tank is shown in the drawings, being designated by the reference character 5. At its outer end the shell 1 is provided with an internally-screw-threaded portion 6, arranged to receive a thermostatic regulator, (designated as a whole by the reference character 7.) This regulator 7 may be of any suitable form and construction and in the present instance comprises a casing 8, having a valve-seat 9, and a tube and rod 10 and 11 of relatively different coefficients of expansion, thereby forming thermostatic means, the rod 11, provided with a valve 12, adapted to engage the seat 9, and inlet and discharge passages 13 and 14. Motive fluid, which in the present instance may be assumed to be water under pressure, will be admitted through the pipe 15 and passage 13 to the interior of the casing 8. If the valve 12 be opened, it will pass the valve-seat 9 into the passage 14 through a pipe 16 to a motor or other device to be regulated. (Not shown.) When the valve 12 is closed down to the seat 9 by means of the thermostatic action of the tube and rods 10 and 11, passage of water from the interior of the casing to the discharge will be prevented, but it will be noted that the casing itself is always open to the inlet, so that by providing branch passages 17 from the interior of the casing to the interior of the socket a continual supply of water will be maintained from the casing to the interior of the socket when the regulator is in position. I have found that the temperature of the incoming water, even though it greatly differs from the temperature of the liquid within the tank 5, will not materially affect the operation of the thermostatic means, because once the socket has been filled water flowing through the regulator for the purpose of operating the motor will not set up any appreciable circulation through the socket, the water in the socket remaining practically quiescent. Thus once the water in the socket has been raised to the temperature of the liquid within the tank it will be retained at substantially the temperature thereof and will vary only as the temperature of the liquid in the tank varies.

By my invention, then, I have provided an exceedingly simple means in a cut-off socket whereby liquid may be employed within the socket around the thermostatic elements of the regulator to properly conduct heat from the liquid in the tank to the thermostatic members without permitting the liquid in the tank to have direct contact with the said thermostatic members. Thus the regulator may be removed at will, because the socket serves as a perfect seal against escape of liquid from the tank, and the mere fitting of the regulator again to the socket will result in liquid being supplied to the socket without any special means being provided therefor other than the presence of the passages 17 in the regulator itself.

It will of course be understood that instead of supplying water directly from the regulator I may supply liquid from other sources, if preferred, and in Fig. 2 I have shown the socket member as provided with a pipe 18, arranged to supply liquid thereto, said pipe controlled by a valve 19. This arrangement and construction is useful where air or gas under pressure is employed in the regulator instead of liquid, though it may of course be employed even though liquid be used in the regulator. The advantage of employing the liquid directly from the regulator when water is employed therein is that thereby outside connections and special controlling means are avoided.

What I claim is—

1. In temperature-regulating means, a socket member having means for securing it to a tank, and means for removably supporting a regulator therein, said socket, closed to admission of liquid from within the tank but provided with means admitting liquid thereto from an outside source.

2. In temperature-regulating means, a cut-off socket arranged to be secured to a tank, and having a portion adapted to be received within the tank, said socket provided with means for removably supporting a regulator, and means for supplying to the socket liquid other than that contained within the tank.

3. Temperature-regulating means comprising a cut-off socket arranged to be secured to a tank and closed to admission of liquid from within said tank, said socket having means for removably supporting a regulator, and a regulator supported thereby, provided with a thermostatic device received within said socket, said temperature-regulating means provided with means for supplying liquid to the socket, other than that contained within the tank.

4. The combination with a cut-off socket arranged to be secured to a tank, and having means for removably supporting a regulator, of a regulator supported thereby, provided with a thermostatic device received within said socket, and means admitting liquid to said regulator for control thereby, said regulator having a passage for supplying liquid to within said socket.

5. In temperature-regulating means, the combination with a cut-off socket arranged to be secured to a tank, and having a portion adapted to be received within the tank but closed to admission of liquid therefrom, of a thermostatic device removably supported within said socket, a regulating-valve controlled by said thermostatic device, means for supplying liquid to be controlled by said valve, and a branch connection for supplying liquid to within said socket, around said thermostatic device.

6. In temperature-regulating means, the combination with a cut-off socket comprising a socket member 1 arranged to be secured to a tank, and a closed tube 2 adapted to extend within the tank, said socket having means for removably supporting a regulator, of a regulator so supported, said regulator having a passage 17 communicating with the interior of the socket.

WILLARD WADSWORTH.

Witnesses:
D. HOWARD HAYWOOD,
C. F. CARRINGTON.